United States Patent
Joe et al.

(10) Patent No.: US 11,034,778 B2
(45) Date of Patent: Jun. 15, 2021

(54) METHOD OF PREPARING GRAFT COPOLYMER

(71) Applicant: LG CHEM, LTD., Seoul (KR)

(72) Inventors: Wang Rae Joe, Daejeon (KR); Bong Keun Ahn, Daejeon (KR); Min Jung Kim, Daejeon (KR); Yong Yeon Hwang, Daejeon (KR); Jang Won Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/619,063

(22) PCT Filed: Nov. 16, 2018

(86) PCT No.: PCT/KR2018/014099
§ 371 (c)(1),
(2) Date: Dec. 3, 2019

(87) PCT Pub. No.: WO2019/098753
PCT Pub. Date: May 23, 2019

(65) Prior Publication Data
US 2020/0095346 A1   Mar. 26, 2020

(30) Foreign Application Priority Data
Nov. 16, 2017   (KR) .......................... 10-2017-0152818

(51) Int. Cl.
| C08F 2/24 | (2006.01) |
| C08F 279/04 | (2006.01) |
| C08F 285/00 | (2006.01) |
| C08F 279/06 | (2006.01) |
| C08L 51/06 | (2006.01) |

(52) U.S. Cl.
CPC .............. *C08F 2/24* (2013.01); *C08F 279/04* (2013.01); *C08F 279/06* (2013.01); *C08F 285/00* (2013.01); *C08L 51/06* (2013.01); *C08L 2207/53* (2013.01)

(58) Field of Classification Search
CPC ........ C08F 2/24; C08F 265/04; C08F 279/04; C08F 279/06; C08F 285/00; C08K 5/524
See application file for complete search history.

(56) References Cited

U.S. PATENT DOCUMENTS

| 4,876,306 | A | * | 10/1989 | Kurokawa | ................ | C08F 2/26 |
| | | | | | | 524/423 |
| 2003/0153710 | A1 | | 8/2003 | Shin et al. | | |
| 2005/0159529 | A1 | | 7/2005 | O et al. | | |
| 2007/0155872 | A1 | | 7/2007 | Hong et al. | | |
| 2009/0162558 | A1 | * | 6/2009 | Bardman | .............. | C08L 51/003 |
| | | | | | | 427/384 |
| 2009/0298998 | A1 | | 12/2009 | Takamura et al. | | |
| 2012/0077909 | A1 | | 3/2012 | Takamura et al. | | |
| 2012/0277374 | A1 | | 11/2012 | Takamura et al. | | |
| 2013/0253133 | A1 | | 9/2013 | Takamura et al. | | |
| 2014/0235749 | A1 | * | 8/2014 | Kim | ........................ | C08L 25/12 |
| | | | | | | 523/122 |
| 2015/0065651 | A1 | | 3/2015 | Takamido et al. | | |

FOREIGN PATENT DOCUMENTS

| JP | S63227606 A | 9/1988 |
| JP | 2003040915 A | 2/2003 |
| JP | 2004521995 A | 7/2004 |
| JP | 2014527570 A | 10/2014 |
| KR | 20050015396 A | 2/2005 |
| KR | 100654525 B1 | 11/2006 |
| KR | 20090038507 A | 4/2009 |
| KR | 20090084334 A | 8/2009 |
| KR | 20100045830 A | 5/2010 |
| KR | 20150002604 A | 1/2015 |
| KR | 20150014073 A | 2/2015 |
| KR | 20150142493 A | 12/2015 |
| KR | 101656798 B1 | 9/2016 |
| KR | 20170122558 A | 11/2017 |
| WO | WO2007118111 A1 | 10/2007 |

OTHER PUBLICATIONS

KR20150142493 machine translation (Year: 2020).*
Search Report dated Feb. 19, 2019 for PCT Application No. PCT/KR2018/014099.
Search Report dated Jun. 22, 2020 for European Application No. 18878744.4.

* cited by examiner

*Primary Examiner* — Irina S Zemel
*Assistant Examiner* — Jeffrey S Lenihan

(57) ABSTRACT

The present invention provides a method of preparing a graft copolymer, which comprises: emulsion-polymerizing one or more selected from the group consisting of an aromatic vinyl-based monomer to prepare a seed, a vinylcyano-based monomer and an alkyl (meth)acrylate-based monomer; emulsion-polymerizing the seed and an alkyl (meth)acrylate-based monomer to prepare a core; and emulsion-polymerizing the core, an aromatic vinyl-based monomer and a vinylcyano-based monomer to prepare a shell, wherein one or more steps selected from the group consisting of the steps of preparing the seed, the core and the shell comprises adding an emulsifier comprising a compound represented by Formula 1 below.

13 Claims, No Drawings

METHOD OF PREPARING GRAFT COPOLYMER

This application is a National Phase entry of International Application No. PCT/KR2018/014099, filed on Nov. 16, 2018, which claims priority to and the benefit of Korean Patent Application No. 10-2017-0152818, filed on Nov. 16, 2017, the disclosure of which is incorporated herein by reference in its entirety.

TECHNICAL FIELD

The present invention relates to a method of preparing a graft copolymer, and more particularly, to a method of preparing a graft copolymer into which a phosphate-based emulsifier is added.

BACKGROUND ART

Generally, an ABS graft copolymer prepared by graft copolymerization of an aromatic vinyl-based monomer and a vinylcyano-based monomer to a diene based rubber polymer prepared by polymerizing a conjugated diene-based monomer has been widely used in electric/electronic products, automobile parts and office equipment because of superior impact resistance and processability, and excellent mechanical properties, a high heat deflection temperature, and a high coloring property.

However, since the diene rubber polymer contains a chemically unstable unsaturated bond, there is a problem in that the polymer is easily aged by UV rays and thus weatherability is very weak.

To improve such a disadvantage, when a thermoplastic resin composition including an ABS graft copolymer is prepared, a method of adding a stabilizer capable of enhancing weatherability has been suggested, but such an effect is insignificant, and thus but the ABS graft copolymer is still vulnerable to UV rays. Therefore, a method of using a polymer polymerized by mixing a conjugated diene monomer and an acrylic monomer, or using a more chemically stable acrylic rubber polymer, rather than a diene rubber polymer including a double bond, has been suggested.

A representative example of the above-described weatherable thermoplastic resin using an acrylic rubber polymer which does not include an unstable double bond is an acrylate-styrene-acrylonitrile copolymer (ASA copolymer), which does not include an unstable double bond in the polymer, thereby exhibiting very excellent weatherability, chemical resistance, drug resistance, and thermal stability, and may be widely used in fields requiring these properties, for example, outdoor electric/electronic parts, building materials, agricultural materials, ASA/ABS double-layered sheets, profile extrusion, road signs, outdoor products, construction PVC, leisure goods, sporting goods, automobile parts, etc.

Meanwhile, in the preparation of the ASA copolymer and an ASA-based resin similar thereto, as an emulsifier, low molecular weight carboxylates having 20 or lower carbon atoms including sodium rosinate, potassium rosinate, sodium laurate, potassium laurate, sodium oleate, potassium oleate, and potassium stearate, or sulfur-containing emulsifiers including dipotassium alkyl sulfosuccinates having 12 to 18 carbon atoms, and alkyl sulfonates or alkyl ester sulfonates having 12 to 20 carbon atoms may be applied.

However, the above-described conventional emulsifier had a problem in that the thermal stability and surface property of a resin are lowered in a high-temperature molding process after polymerization. Recently, as the application range of the ASA-based resin becomes thinner with a siding, a sheet, a co-extrusion film, etc., there is a further growing need for techniques for reducing thermal discoloration by improving thermal stability in a molding process with a residual emulsifier in the resin, and enhancing appearance quality.

DISCLOSURE

Technical Problem

The present invention is directed to providing a graft copolymer having excellent thermal stability and a considerably low amount of gas generation. In addition, the present invention is also directed to providing a thermoplastic resin composition having excellent thermal stability and whiteness.

Technical Solution

One aspect of the present invention provides a method of preparing a graft copolymer, which comprises: emulsion-polymerizing one or more selected from the group consisting of an aromatic vinyl-based monomer, a vinylcyano-based monomer and an alkyl (meth)acrylate-based monomer to prepare a seed; emulsion-polymerizing the seed and an alkyl (meth)acrylate-based monomer to prepare a core; and emulsion-polymerizing the core, an aromatic vinyl-based monomer and a vinylcyano-based monomer to prepare a shell, wherein one or more steps selected from the group consisting of the steps of preparing the seed, the core and the shell comprises adding an emulsifier comprising a compound represented by Formula 1 below.

<Formula 1>

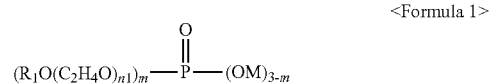

In Formula 1, $R_1$ is a $C_1$ to $C_{20}$ alkyl group, or a $C_6$ to $C_{20}$ aryl group substituted with a $C_1$ to $C_{20}$ alkyl group, M is hydrogen or an alkali metal, m is 1 or 2, and $n_1$ is any one of 1 to 18.

Another aspect of the present invention provides a thermoplastic resin composition, which comprises: the graft copolymer prepared by the above-described method; and a copolymer comprising units derived from an aromatic vinyl-based monomer and units derived from a vinylcyano-based monomer.

Advantageous Effects

A graft copolymer prepared by a method of preparing a graft copolymer according to the present invention can have excellent thermal stability, and can be considerably reduced in an amount of gas generation. In addition, the thermoplastic resin composition according to the present invention can have excellent thermal stability, whiteness and surface gloss, and thus can be more improved in appearance quality. In addition, the thermoplastic resin composition of the present invention can be further improved in mechanical properties such as impact strength and tensile strength.

MODES OF THE INVENTION

Hereinafter, to help in understanding of the present invention, the present invention will be described in further detail.

Terms and words used in the specification and claims should not be construed as limited to general or dictionary terms, and should be interpreted with the meaning and concept in accordance with the technical idea of the present invention based on the principle that the inventors have appropriately defined the concepts of terms in order to explain the invention in the best way.

In the present invention, 1 g of the seed, core or graft copolymer latex is mixed with 100 g of distilled water, and then the average particle sizes of the seed, core and graft copolymer may be measured in a Gaussian mode using Nicomp 380HPL (manufacturer: PSS-Nicomp Co., USA) through dynamic laser light scattering.

In the present invention, the alkyl group may be a methyl group, an ethyl group, a propyl group, an n-propyl group, an isopropyl group, a butyl group, an n-butyl group, an isobutyl group, a t-butyl group, an s-butyl group, a 1-methyl-butyl group, a 1-ethyl-butyl group, a pentyl group, a n-pentyl group, an isopentyl group, a neopentyl group, a t-pentyl group, a hexyl group, a n-hexyl group, a 1-methylpentyl group, a 2-methylpentyl group, a 4-methyl-2-pentyl group, a 3,3-dimethylbutyl group, a 2-ethylbutyl group, a heptyl group, an n-heptyl group, a 1-methylhexyl group, a cyclopentylmethyl group, a cyclohexylmethyl group, an octyl group, a n-octyl group, a t-octyl group, a 1-methylheptyl group, a 2-ethylhexyl group, a 2-propylpentyl group, a n-nonyl group, a 2,2-dimethylheptyl group, a 1-ethyl-propyl group, a 1,1-dimethyl-propyl group, an isohexyl group, a 2-methylpentyl group, a 4-methylhexyl group or a 5-methylhexyl group, but the present invention is not limited thereto.

In the present invention, the aryl group may include monocyclic and polycyclic rings. Here, the polycyclic ring means an aryl group directly linked to or condensed with a different ring group. Here, the different ring group may be an aryl group, but other types of ring groups, for example, a cycloalkyl group, a heterocycloalkyl group, and a heteroaryl group may be used. The aryl group includes a spiro group. Specific examples of the aryl groups may include a phenyl group, a biphenyl group, a triphenyl group, a naphthyl group, an anthryl group, a chrysenyl group, a phenanthrenyl group, a perylenyl group, a fluoranthenyl group, a triperylenyl group, a phenalenyl group, a pyrenyl group, a tetracenyl group, a pentacenyl group, a fluorenyl group, an indenyl group, an acenaphthylenyl group, a benzofluorenyl group, a spirobifluorenyl group, a 2,3-dihydro-1H-indenyl group, and condensed ring groups thereof, but the present invention is not limited thereto.

1. Method of Preparing Graft Copolymer

A method of preparing a graft copolymer according to an exemplary embodiment of the present invention comprises: 1) emulsion-polymerizing one or more selected from the group consisting of an aromatic vinyl-based monomer, a vinylcyano-based monomer and an alkyl (meth)acrylate-based monomer to prepare a seed; 2) emulsion-polymerizing the seed and an alkyl (meth)acrylate-based monomer to a core; and 3) emulsion-polymerizing the core, an aromatic vinyl-based monomer and a vinylcyano-based monomer to prepare a shell, wherein one or more steps selected from the group consisting of the steps of preparing the seed, the core and the shell comprises adding an emulsifier comprising a compound represented by Formula 1 below:

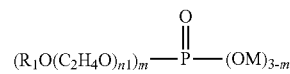
<Formula 1>

In Formula 1, $R_1$ is a $C_1$ to $C_{20}$ alkyl group, or a $C_6$ to $C_{20}$ aryl group substituted with a $C_1$ to $C_{20}$ alkyl group, M is hydrogen or an alkali metal, m is 1 or 2, and $n_1$ is any one of 1 to 18.

The emulsifier including the compound represented by Formula 1 (hereinafter, referred to as a "phosphate-based emulsifier") may improve the thermal stability of the graft copolymer, and considerably reduce an amount of gas generation. In addition, in the injection of a thermoplastic resin composition including the graft copolymer, appearance qualities such as the surface gloss and whiteness may be improved.

$R_1$ may be a $C_1$ to $C_{20}$ alkyl group, and preferably a $C_{13}$ to $C_{17}$ alkyl group.

M is preferably sodium or potassium.

$n_1$ may be any one of 1 to 15 or 2 to 10, and preferably 2 to 10.

The compound represented by Formula 1 may be one or more selected from the group consisting of lauryl ether hexaethyleneoxide phosphoric acid, myristic ether hexaethyleneoxide phosphoric acid, palmitic ether hexaethyleneoxide phosphoric acid, stearic ether hexaethyleneoxide phosphoric acid, lauryl ether octaethyleneoxide phosphoric acid, myristic ether octaethyleneoxide phosphoric acid, palmitic ether octaethyleneoxide phosphoric acid, stearic ether octaethyleneoxide phosphoric acid, di(lauryl ether hexaethyleneoxide)phosphoric acid, di(myristic ether hexaethyleneoxide)phosphoric acid, di(palmitic ether hexaethyleneoxide) phosphoric acid, di(stearic ether hexaethyleneoxide) phosphoric acid, di(myristic ether octaethylene oxide) phosphoric acid and di(palmitic ether octaethyleneoxide) phosphoric acid and di(stearic ether octaethyleneoxide) phosphoric acid, or an alkali metal salt thereof, and preferably a sodium salt or a potassium salt thereof, and most preferably, a sodium salt thereof.

The compound represented by Formula 1 may have a CAS No. of 68186-29-8.

The phosphate-based emulsifier may further include a compound represented by Formula 2.

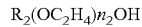
<Formula 2>

In Formula 2, $R_2$ is a $C_1$ to $C_{20}$ alkyl group or a $C_6$ to $C_{20}$ aryl group substituted with a $C_1$ to $C_{20}$ alkyl group, and $n_2$ is any one of 1 to 18.

$R_2$ may be a $C_{10}$ to $C_{20}$ alkyl group, and preferably a $C_{13}$ to $C_{17}$ alkyl group.

$n_2$ may be any one of 1 to 15 or 2 to 10, and preferably 2 to 10.

The compound represented by Formula 2 may have a CAS No. of 24938-91-8.

The phosphate-based emulsifier may include the compound represented by Formula 1 and the compound represented by Formula 2 at a weight ratio of 80:20 to 99:1, 85:15 to 98:2 or 90:10 to 97:3, and preferably, 90:10 to 97:3.

The phosphate-based emulsifier may further include water at 15 wt % or less, 1 to 14 wt %, or 5 to 13 wt % with respect to the total weight of the phosphate-based emulsifier.

As the phosphate-based emulsifier, among the commercially available materials, phosphanol RS-610NA manufactured by TOHO CHEMICAL INDUSTRY Co., Ltd. may be used.

The phosphate-based emulsifier may be added in one of the steps of preparing a seed, a core and a shell, and specifically, the step of preparing a core or shell. The phosphate-based emulsifier may be added in two or more of the steps of preparing a seed, a core and a shell, and specifically, the steps of preparing a core and a shell. In addition, it is most preferable that the phosphate-based emulsifier is added in all of the three steps.

Meanwhile, the phosphate-based emulsifier may be used after being mixed with one or more general emulsifiers selected from the group consisting of a $C_1$ to $C_{20}$ mono carboxylate, a $C_{12}$ to $C_{18}$ metal succinate, a metal sulfonate and a metal rosinate. The phosphate-based emulsifier may be mixed with a $C_1$ to $C_{20}$ mono carboxylate.

The mono carboxylate may be a $C_8$ to $C_{20}$ fatty acid soap, and the $C_{12}$ to $C_{18}$ metal succinate may be a $C_{12}$ to $C_{18}$ dipotassium alkenyl succinate.

The metal sulfonate may be one or more selected from the group consisting of sodium dodecyl sulfate, sodium dodecyl benzene sulfate, sodium octadecyl sulfate, sodium oleic sulfate, potassium dodecyl sulfate and potassium octadecyl sulfate.

The metal rosinate may be one or more selected from the group consisting of potassium rosinate and sodium rosinate.

The phosphate-based emulsifier and the general emulsifier may be mixed at a weight ratio of 1:1 to 1:5, 1:1.5 to 1:4.5, or 1:2 to 1:4, and preferably 1:2 to 1:4.

When the above-mentioned range is satisfied, the thermal stability of the graft copolymer may be improved, and an amount of gas generation may be reduced.

When a mixture of the phosphate-based emulsifier and the mono carboxylate is added, a weight ratio of the phosphate-based emulsifier and mono carboxylate may be 1:1 to 1:5, 1:1.5 to 1:4.5 or 1:2 to 1:4, and preferably 1:2 to 1:4. When the above-mentioned range is satisfied, the thermal stability of the graft copolymer may be improved, and appearance qualities such as surface gloss and whiteness may be improved in the injection of the thermoplastic resin composition.

Hereinafter, each steps of the method of preparing a graft copolymer according to an exemplary embodiment of the present invention will be described in further detail.

1) Step of Preparing Seed

First, one or more selected from the group consisting of an aromatic vinyl-based monomer, a vinylcyano-based monomer and an alkyl (meth)acrylate-based monomer is/are subjected to emulsion polymerization.

In the preparation of a seed, to further enhance impact resistance and weatherability, emulsion polymerization may be performed by independently adding the aromatic vinyl-based monomer, independently adding the alkyl (meth)acrylate-based monomer, adding both of the aromatic vinyl-based monomer and the vinylcyano-based monomer, adding both of the alkyl (meth)acrylate-based monomer and the aromatic vinyl-based monomer, adding both of the alkyl (meth)acrylate-based monomer and the vinylcyano-based monomer, or adding all of the alkyl (meth)acrylate-based monomer, the aromatic vinyl-based monomer and the vinylcyano-based monomer.

The alkyl (meth)acrylate-based monomer may be a linear $C_1$ to $C_{20}$ alkyl (meth)acrylate or a branched $C_3$ to $C_{20}$ alkyl (meth)acrylate, preferably, a linear $C_1$ to $C_{20}$ alkyl (meth)acrylate, and more preferably, a linear $C_1$ to $C_4$ alkyl (meth)acrylate.

The alkyl (meth)acrylate-based monomer may be one or more selected from the group consisting of methyl acrylate, ethyl acrylate, propyl acrylate, butyl acrylate, hexyl acrylate, octyl acrylate, 2-ethylhexyl acrylate, and preferably, butyl acrylate.

The aromatic vinyl-based monomer may be one or more selected from the group consisting of styrene, α-methylstyrene, p-methylstyrene and 2,4-dimethylstyrene, and preferably styrene.

The vinylcyano-based monomer may be one or more selected from the group consisting of acrylonitrile, methacrylonitrile and ethacrylonitrile, and preferably, acrylonitrile.

The total weight of the monomers added in the step of preparing a seed may be 4 to 20 wt %, 4 to 15 wt % or 4 to 10 wt %, and preferably, 4 to 10 wt %, with respect to the total weight of the monomers added in the preparation of a graft copolymer. When the above-mentioned range is satisfied, the graft copolymer exhibits an excellent balance of physical properties such as impact resistance and weatherability.

The emulsion polymerization may be performed in the presence of one or more selected from the group consisting of an emulsifier, an initiator, a crosslinking agent, a grafting agent, an electrolyte and water. The emulsion polymerization may be performed in the presence of all of the materials.

As the emulsifier, one or more selected from the group consisting of the above-described phosphate-based emulsifier and a general emulsifier may be used, and the above-described phosphate-based emulsifier, a mixture of the phosphate-based emulsifier and a metal sulfonate among the general emulsifier, or the general emulsifier is preferably used.

The emulsifier may be added at 0.01 to 0.29 part by weight, 0.01 to 0.25 part by weight, or 0.01 to 0.15 part by weight, and preferably, 0.01 to 0.15 part by weight, with respect to 100 parts by weight of the total weight of the monomers added in the preparation of a graft copolymer. When the above-mentioned range is satisfied, the thermal stability of the graft copolymer may be improved, and an amount of gas generation may be considerably reduced. In addition, appearance qualities such as surface gloss and whiteness in the injection of a thermoplastic resin composition including the graft copolymer may be improved. In addition, the graft copolymer exhibits an excellent mechanical property such as impact strength, and an amount of gas generation in high-temperature molding is reduced.

The initiator may be one or more selected from the group consisting of a water-soluble initiator and a lipid-soluble initiator. The water-soluble initiator may be one or more selected from the group consisting of sodium persulfate, potassium persulfate, ammonium sulfate, potassium perphosphate and hydrogen peroxide. The lipid-soluble initiator may be one or more selected from the group consisting of t-butyl peroxide, cumene hydroperoxide, p-menthane hydroperoxide, di-t-butyl peroxide, t-butyl cumyl peroxide, acetyl peroxide, isobutyl peroxide, octanoyl peroxide, dibenzoyl peroxide, diisopropylbenzene hydroperoxide, 5,5-trimethylhexanol peroxide, t-butyl peroxy isobutyrate, azobis isobutyronitrile, azobis-2,4-dimethylvaleronitrile, azobiscyclohexanecarbonitrile and azobis methyl butyrate.

As the initiator, potassium persulfate which can easily control the reaction rate at the initial stage of polymerization, and easily prepare a polymer having a desired average particle size is preferably used.

The initiator may be added at 0.01 to 3 parts by weight, 0.01 to 1 part by weight or 0.01 to 0.5 part by weight, and preferably, 0.01 to 0.5 part by weight, with respect to 100 parts by weight of the total weight of the monomers added in the preparation of a graft copolymer. When the above-mentioned range is satisfied, polymerization stability and polymerization efficiency are improved.

The crosslinking agent may be an acrylic compound, and the acrylic compound may be one or more selected from the group consisting of polyethylene glycol diacrylate, polyethylene glycol dimethacrylate, polypropylene glycol diacrylate, polypropylene glycol dimethacrylate, ethylene glycol diacrylate, ethylene glycol dimethacrylate, divinylbenzene, diethylene glycol dimethacrylate, triethylene glycol dimethacrylate, 1,3-butadiol dimethacrylate, hexanediolpropoxylate diacrylate, neopentyl glycol dimethacrylate, neopentyl glycol ethoxylate diacrylate, neopentyl glycol propoxylate diacrylate, trimethylolpropane trimethacrylate, trimethylolmethane triacrylate, trimethylpropane ethoxylate triacrylate, trimethylpropane propoxylate triacrylate, pentaerythritol ethoxylate triacrylate, pentaerythritol propoxylate triacrylate and vinyl trimethoxysilane, and preferably ethylene glycol dimethacrylate.

The crosslinking agent may be included at 0.01 to 1 part by weight or 0.01 to 0.5 part by weight with respect to 100 parts by weight of the total weight of the monomers added in the preparation of a graft copolymer. When the above-mentioned range is satisfied, some of the monomers added in the preparation of a seed may be prepared as a crosslinked polymer, and the other monomers may be used to form a crosslinked structure of the monomers added in the preparation of a core.

The grafting agent may be a compound including an unsaturated vinyl group having two or more different reactivities, and the compound may be one or more selected from the group consisting of allyl methacrylate, triallyl isocyanurate, diallyl amine and triallyl amine, and preferably, allyl methacrylate.

The grafting agent may be added at 0.01 to 3 parts by weight, 0.01 to 1 part by weight or 0.01 to 0.5 part by weight, and most preferably, 0.01 to 0.5 part by weight, with respect to 100 parts by weight of the total weight of the monomers added in the preparation of a graft copolymer. When the above-mentioned range is satisfied, the grafting agent may be first reacted at a surface of the seed, and grafting efficiency of the monomer added in the core step may be increased.

The electrolyte may be one or more selected from the group consisting of KCl, NaCl, $KHCO_3$, $NaHCO_3$, $K_2CO_3$, $Na_2CO_3$, $KHSO_3$, $NaHSO_3$, $K_4P_2O_7$, $Na_4P_2O_7$, $K_3PO_4$, $Na_3PO_4$, $K_2HPO_4$, $Na_2HPO_4$, KOH, NaOH and $Na_2S_2O_7$, and preferably KOH.

The electrolyte may be added at 0.001 to 1 part by weight, 0.005 to 1 part by weight or 0.01 to 0.5 part by weight, and preferably 0.01 to 0.5 part by weight with respect to 100 parts by weight of the total weight of the monomers added in the preparation of a graft copolymer. When the above-mentioned range is satisfied, the stability of the polymerization reaction may be enhanced, and a graft copolymer having a desired average particle size may be easily prepared.

The emulsion polymerization may be performed at 40 to 80° C. or 50 to 75° C., and to ensure polymerization stability and form a seed having a uniform average particle size, the initiator may be added after a temperature of the reactants reaches the above-described range.

The average particle size of the seed may be 90 to 400 nm, 150 to 300 nm or 150 to 250 nm, and preferably 150 to 250 nm. When the above-mentioned range is satisfied, a mechanical property such as the impact resistance of a thermoplastic resin composition including the graft copolymer may be further enhanced.

After 1 g of a rubber polymer latex is mixed with 100 g of distilled water, the average particle size of the seed may be measured in a Gaussian mode using Nicomp 3801-1PL (manufacturer: PSS-Nicomp Co., USA) through dynamic laser light scattering.

2) Step of Preparing Core

Subsequently, the seed and an alkyl (meth)acrylate-based monomer are subjected to emulsion polymerization.

The core may be prepared by surrounding the seed.

A specific example of the alkyl (meth)acrylate-based monomer is the same as described in 1) Step of preparing seed.

The alkyl (meth)acrylate-based monomer may be added at 30 to 60 wt %, 35 to 55 wt % or 40 to 50 wt %, and preferably 40 to 50 wt %, with respect to the total weight of the monomers added in the preparation of the graft copolymer. When the above-mentioned range is satisfied, a graft copolymer having an excellent reaction balance in emulsion polymerization and excellent impact resistance and weatherability may be prepared.

The emulsion polymerization may be performed in the presence of one or more selected from the group consisting of an emulsifier, an initiator, a crosslinking agent, a grafting agent and water. The emulsion polymerization is preferably performed in the presence of all of the above-mentioned materials.

As the emulsifier, one or more selected from the group consisting of the above-described phosphate-based emulsifier and a general emulsifier may be used, and a metal sulfonate of the above-described phosphate-based emulsifier, a mixture of the phosphate-based emulsifier and a general emulsifier or a general emulsifier is preferably used.

The emulsifier may be added at 0.1 to 1 part by weight, 0.2 to 0.9 part by weight or 0.3 to 0.8 part by weight, and preferably, 0.3 to 0.8 part by weight, with respect to 100 parts by weight of the total weight of the monomers added in the preparation of a graft copolymer. When the above-mentioned range is satisfied, the thermal stability of the graft copolymer may be improved, and an amount of gas generation may be considerably reduced. In addition, in the injection of a thermoplastic resin composition including the graft copolymer, appearance qualities such as surface gloss and whiteness may be improved. In addition, a mechanical property such as impact strength is superior and an amount of gas generation in high-temperature molding is reduced.

The initiator may be added at 0.005 to 0.1 part by weight, 0.01 to 0.09 part by weight or 0.02 to 0.08 part by weight, and preferably, 0.02 to 0.08 part by weight, with respect to 100 parts by weight of the total weight of the monomers added in the preparation of a graft copolymer. When the above-mentioned range is satisfied, polymerization stability and polymerization efficiency are improved.

The crosslinking agent may be added at 0.01 to 1 part by weight, 0.01 to 0.8 part by weight or 0.01 to 0.6 part by weight, and preferably, 0.01 to 0.6 part by weight, with respect to 100 parts by weight of the total weight of the monomers added in the preparation of a graft copolymer. When the above-mentioned range is satisfied, some of the monomers added in the preparation of a core are prepared as a crosslinked polymer, and the other monomers may be used to form a crosslinked structure of the monomers added in the shell step.

The grafting agent may be added at 0.01 to 1 part by weight, 0.01 to 0.8 part by weight or 0.01 to 0.6 part by weight, and preferably, 0.01 to 0.6 part by weight, with respect to 100 parts by weight of the total weight of the monomers added in the preparation of a graft copolymer. When the above-mentioned range is satisfied, the grafting agent may be first reacted on a core surface, and grafting efficiency with the monomers added in the shell step may be increased.

Specific examples of the emulsifier, the initiator, the crosslinking agent and the grafting agent are the same as described in 1) Step of preparing seed.

In the step of preparing a core, it is preferable to mix reactants being added to a polymerization reaction in a separate reactor, and then continuously add the mixture to ensure reaction balance and polymerization stability.

The continuous adding of the reactants may be performed at a constant rate without interruption for a predetermined time, for example, 30 minutes or more, 60 to 180 minutes, or 90 to 120 minutes. The continuous adding may also be performed in a drop-by-drop method.

The average particle size of the core may be larger than that of the seed, and may be 180 to 600 nm, 250 to 550 nm or 300 to 500 nm, and preferably, 300 to 500 nm. When the above-mentioned range is satisfied, the stability of the core latex may be superior, and a thermoplastic resin composition including the graft copolymer may have more improved impact resistance, weatherability and appearance quality.

The average particle size of the core may be measured by the same method used for measuring the average particle size of the seed.

3) Step of Preparing Shell

Subsequently, the core, the aromatic vinyl-based monomer and the vinylcyano-based monomer are subjected to emulsion polymerization.

The aromatic vinyl-based monomer may be added at 20 to 50 wt % or 25 to 45 wt % or 30 to 40 wt %, and preferably, 30 to 40 wt %, with respect to the total weight of the monomers added in the preparation of a graft copolymer. When the above-mentioned range is satisfied, a graft copolymer having an excellent reaction balance and excellent impact resistance and weatherability may be prepared.

The vinylcyano-based monomer may be added at 5 to 20 wt %, 8 to 19 wt % or 10 to 18 wt %, and preferably, 10 to 18 wt %, with respect to the total weight of the monomers added in the preparation of a graft copolymer. When the above-mentioned range is satisfied, a graft copolymer having an excellent reaction balance and excellent impact resistance and weatherability may be prepared.

Specific examples of the aromatic vinyl-based monomer and the vinyl cyano-based monomer are the same as described in 1) Step of preparing seed.

The emulsion polymerization may be performed in the presence of one or more selected from the group consisting of an emulsifier, an initiator, a molecular weight modifier and water. The emulsion polymerization may be performed in the presence of one or more selected from the group consisting of an emulsifier, an initiator and water.

As the emulsifier, one or more selected from the group consisting of the above-described phosphate-based emulsifier and a general emulsifier may be used, and a metal sulfonate among the above-described phosphate-based emulsifier, a mixture of the phosphate-based emulsifier and a general emulsifier or a general emulsifier is preferably used.

The emulsifier may be added at 0.1 to 3 parts by weight, 0.2 to 2.8 parts by weight or 0.3 to 2.5 parts by weight, and preferably, 0.3 to 2.5 parts by weight, with respect to 100 parts by weight of the total weight of the monomers added in the preparation of a graft copolymer. When the above-mentioned range is satisfied, the thermal stability of the graft copolymer may be improved, and an amount of gas generation may be considerably reduced. In addition, in the injection of a thermoplastic resin composition including the graft copolymer, appearance qualities such as surface gloss and whiteness may be improved. In addition, a mechanical property such as an impact strength is superior, and an amount of gas generation in high-temperature molding is reduced.

The initiator may be added at 0.01 to 3 parts by weight, 0.05 to 1 part by weight or 0.1 to 0.5 part by weight, and preferably, 0.1 to 0.5 part by weight, with respect to 100 parts by weight of the total weight of the monomers added in the preparation of a graft copolymer. When the above-mentioned range is satisfied, polymerization stability and polymerization efficiency are improved.

Specific examples of the initiator are the same as described in 1) Step of preparing seed, and a lipid-soluble initiator is preferably used.

To promote the activity of the initiator and enhance reaction efficiency, a redox catalyst may be further added.

The redox catalyst may be one or more selected from the group consisting of sodium pyrophosphate, dextrose, ferrous sulfide, sodium sulfite, sodium formaldehyde sulfoxylate and sodium ethylene diamine tetraacetate, and preferably, one or more selected from the group consisting of sodium pyrophosphate, dextrose and ferrous sulfide.

The redox catalyst may be added at 0.001 to 1 part by weight, 0.002 to 0.7 part by weight or 0.002 to 0.5 part by weight, and preferably, 0.002 to 0.5 part by weight, with respect to 100 parts by weight of the total weight of the monomers added in the preparation of a graft copolymer. When the above-mentioned range is satisfied, polymerization stability and polymerization efficiency are improved.

The molecular weight modifier may be one or more selected from the group consisting of t-dodecyl mercaptan, n-dodecyl mercaptan and n-octyl mercaptan, and preferably, t-dodecyl mercaptan.

The molecular weight modifier may be added at 0.01 to 2 parts by weight, 0.01 to 1 part by weight or 0.01 to 0.5 part by weight, and preferably, 0.01 to 0.5 part by weight, with respect to 100 parts by weight of the total weight of the monomers added in the preparation of a graft copolymer. When the above-mentioned range is satisfied, polymerization stability and efficiency may be enhanced.

In the step of preparing a shell, the core, the aromatic vinyl-based monomer and the vinyl cyano-based monomer may be first added into a reactor, and a mixture prepared by mixing an emulsifier, an initiator and a molecular weight modifier in a separate reactor is continuously added into the reactor, which is preferable for enhancing reaction efficiency and stability.

The continuous adding of the reactants may be performed at a constant rate without interruption for a predetermined time, for example, 30 minutes or more, 60 to 300 minutes, or 90 to 240 minutes. The continuous adding may also be performed in a drop-by-drop method.

A graft copolymer latex obtained in the step of preparing a shell may have an coagulation content of 1 wt % or less (based on 100 wt % of the latex), 0.5 wt % or less or 0.1 wt % or less, and preferably, 0.1 wt % or less. When the above-mentioned range is satisfied, the productivity of the graft copolymer is excellent, and mechanical properties and appearance qualities are enhanced.

The graft copolymer latex may be obtained as a powder through conventional processes including coagulation, aging, dehydration, washing and drying.

The average particle size of the graft copolymer including the shell is larger than that of the core, for example, 250 to 700 nm, 300 to 600 nm or 300 to 500 nm, and preferably, 300 to 500 nm. When the above-mentioned range is satisfied, the stability of the graft copolymer latex is excellent, and the impact resistance, weatherability and appearance quality of a thermoplastic resin composition including the graft copolymer may be further enhanced.

The average particle size of the graft copolymer may be measured by the same method used for measuring the average particle size of the seed.

2. Thermoplastic Resin Composition

The thermoplastic resin composition includes a graft copolymer prepared by the above-described method of preparing a graft copolymer; and a copolymer comprising units derived from an aromatic vinyl-based monomer and units derived from a vinyl cyano-based monomer.

The units derived from the aromatic vinyl-based monomer may be units derived from the aromatic vinyl-based monomer described in 1) Step of preparing seed, and preferably units derived from styrene.

The units derived from the vinylcyano-based monomer may be units derived from the vinylcyano-based monomer described in 1) Step of preparing seed, and preferably, units derived from acrylonitrile.

The copolymer may be a styrene-acrylonitrile copolymer.

A weight ratio of the units derived from the aromatic vinyl-based monomer and the units derived from vinyl-cyano-based monomer may be 60:40 to 85:15, or 65:35 to 80:20. When the above-mentioned range is satisfied, the copolymer has enhanced mechanical properties, weatherability and appearance qualities.

A weight ratio of the graft copolymer and the copolymer may be 20:80 to 40:60, 30:70 to 50:50 or 40:60 to 50:50, and preferably, 40:60 to 50:50.

The thermoplastic resin composition may further include an additive. The additive may be one or more selected from the group consisting of a flame retardant, a lubricant, an antibacterial agent, a releasing agent, a nucleating agent, a plasticizer, a thermal stabilizer, an antioxidant, a photostabilizer, a pigment, a dye and a compatibilizer.

The additive may be included at 0.1 to 10 parts by weight, 0.5 to 7 parts by weight or 1 to 5 parts by weight, and preferably, 1 to 5 parts by weight, with respect to 100 parts by weight of the total weight of the graft copolymer and the copolymer.

The thermoplastic resin composition may be subjected to one or more processes selected from the group consisting of extrusion and injection. The thermoplastic resin composition is preferably injected after extrusion.

The extrusion may provide a pellet by kneading components of the thermoplastic resin composition, and extruding the resulting product, and the kneading and extrusion may be performed at 200 to 300° C. and 30 to 100 rpm, or at 200 to 280° C. and 30 to 70 rpm. When the above-mentioned range is satisfied, the resin composition has excellent processability.

The extruded thermoplastic resin composition may be injected under conditions of 190 to 300° C. and 30 to 80 bar, or 200 to 250° C. and 30 to 70 bar. When the above-mentioned range is satisfied, excellent processability and desirable mechanical properties and appearance qualities may be exhibited.

The extruded thermoplastic resin composition may have a retention thermal stability of 4 or less, 0.1 to 3.5 or 0.1 to 3.3.

The retention stability may be obtained by retaining the extruded thermoplastic resin composition in an injection molding machine at 260° C. for 5 to 10 minutes, measuring L, a and b values using CIE LAB color coordinates to determine a degree of discoloration of the molded specimen, and calculating a discoloration degree (LE) using Mathematical Equation 1 below.

$$\Delta E = \sqrt{(L'-L_0)^2 + (a'-a_0)^2 + (b'-b_0)^2}$$

In the above Equation, L', a' and b' are L, a and b values measured using CIE LAB color coordinates after retaining the extruded thermoplastic resin composition in a 260° C. injection molding machine for 5 to 10 minutes, and $L_0$, $a_0$ and $b_0$ are L, a and b values measured using CIE LAB color coordinates before retention in an injection molding machine.

EXAMPLES

Hereinafter, examples of the present invention will be described in detail to be carried out by those of ordinary skill in the art. However, the present invention may be implemented in various forms and is not limited to the examples to be described below.

Example 1

<Preparation of Seed>

Polymerization was initiated by batch-wise adding 4.8 parts by weight of styrene (S), 1.2 parts by weight of acrylonitrile (AN), 0.05 part by weight of sodium dodecyl sulfate (SDS) as an emulsifier, 0.03 part by weight of ethylene glycol dimethacrylate as a crosslinking agent, 0.02 part by weight of allyl methacrylate as a grafting agent, 0.025 part by weight of KOH as an electrolyte and 53.32 parts by weight of distilled water into a nitrogen-substituted reactor, raising a temperature to 70° C., and batch-wise adding 0.03 part by weight of potassium persulfate as an initiator. The polymerization was performed for 2 hours, and then the reaction was terminated, thereby obtaining a rubber polymer latex as a seed. Here, the average particle size of the seed was 150 nm.

Meanwhile, 1 g of the rubber polymer latex was mixed with 100 g of distilled water, and then the average particle size of the seed was measured in a Gaussian mode using Nicomp 380HPL (manufacturer: PSS-Nicomp Co., USA) through dynamic laser light scattering.

<Preparation of Core>

Polymerization was performed while a reaction solution prepared by mixing 50 parts by weight of butyl acrylate (BA), 0.6 part by weight of Phosphanol RS-610 (trade name, manufacturer: Toho Chemical Industry) as an emulsifier, 0.1 part by weight of ethylene glycol dimethacrylate as a crosslinking agent, 0.04 part by weight of allyl methacrylate as a grafting agent, 30 parts by weight of distilled water and 0.05 part by weight of potassium persulfate as an initiator was continuously added into a reactor in which the seed was present for 4 hours, and then continued for 1 hour. After the reaction, a rubber polymer latex as a core was obtained. Here, the average particle size of the core was 320 nm.

Meanwhile, the average particle size of the core was measured by the same method as used for the seed.

<Preparation of Shell>

Polymerization was performed while first adding 32 parts by weight of styrene, 12 parts by weight of acrylonitrile, and 39 parts by weight of distilled water, and continuously adding a mixture including 1.9 parts by weight of Phosphanol RS-610 (trade name, manufacturer: Toho Chemical Industry) as an emulsifier, 0.19 part by weight of tertiary butyl peroxy ethylhexyl mono carbonate as an initiator, and 0.16 part by weight of sodium pyrophosphate as a redox catalyst, 0.24 part by weight of dextrose and 0.004 part by weight of ferrous sulfate into a reactor in which the core was present at 75° C., and then continued for 1 hour. A temperature of the reactor was decreased to 60° C. to terminate the reaction, and thereby a graft copolymer latex was obtained. Here, the average particle size of the graft copolymer latex was 380 nm.

Meanwhile, the average particle size of the graft copolymer latex was measured by the same method as used for the seed.

<Preparation of Graft Copolymer Powder>

0.8 part by weight of an aqueous solution of calcium chloride was added to the graft copolymer latex, and the mixture was coagulated under atmospheric pressure for 7 minutes at 70° C., aged for 7 minutes at 93° C., dehydrated and washed and then dried for 30 minutes with 90° C. hot wind, thereby preparing a graft copolymer powder.

<Preparation of Thermoplastic Resin Composition>

44 parts by weight of the graft copolymer powder, 56 parts by weight of a styrene-acrylonitrile copolymer (manufacturer: LG Chemical, trade name: 90HR, composition: 27 wt % of units derived from acrylonitrile and 73 wt % of units derived from styrene) as a rigid matrix, 1.5 parts by weight of a lubricant (manufacturer: SUNKOO Ltd., trade name: EBS resin), 0.5 part by weight of IRGANOX1076 (trade name, manufacturer: BASF) and 0.5 part by weight of IRGGAFOS168 (trade name, manufacturer: BASF) as antioxidants, and 0.5 part by weight of Tinuvin P (trade name, manufacturer: BASF) and 0.5 part by weight of Tinuvin 770 (trade name, manufacturer: BASF) as UV stabilizers were mixed. The mixture was prepared in the form of a pellet using a 36-phi extrusion kneading machine at a cylinder temperature of 220° C., and the pellet-type resin was injected (injection temperature: 220° C., injection pressure: 50 bar), thereby preparing a specimen for measuring a physical property.

Example 2

A specimen was prepared by the same method as described in Example 1, except that a seed was prepared by adding 6.0 parts by weight of butyl acrylate instead of 4.8 parts by weight of styrene and 1.2 parts by weight of acrylonitrile.

Here, the average particle size of the seed was 155 nm, the average particle size of the core was 326 nm, and the average particle size of the graft copolymer latex was 396 nm.

Example 3

A specimen was prepared by the same method as described in Example 1, except that a seed was prepared by adding 6.0 parts by weight of styrene instead of 4.8 parts by weight of styrene and 1.2 parts by weight of acrylonitrile.

Here, the average particle size of the seed was 152 nm, the average particle size of the core was 320 nm, and the average particle size of the graft copolymer latex was 388 nm.

Example 4

A specimen was prepared by the same method as described in Example 1, except that a shell was prepared by adding 1.9 parts by weight of sodium rosinate instead of Phosphanol RS-610.

Here, the average particle size of the graft copolymer latex was 390 nm.

Example 5

A specimen was prepared by the same method as described in Example 1, except that a core was prepared by adding 0.6 part by weight of sodium dodecyl sulfate instead of Phosphanol RS-610.

Here, the average particle size of the graft copolymer latex was 389 nm.

Example 6

A specimen was prepared by the same method as described in Example 1, except that a seed was prepared by adding 0.025 part by weight of Phosphanol RS-610 instead of 0.05 part by weight of sodium dodecyl sulfate.

Here, the average particle size of the seed was 115 nm, the average particle size of the core was 241 nm, and the average particle size of the graft copolymer latex was 300 nm.

Comparative Example 1

A specimen was prepared by the same method as described in Example 1, except that a core was prepared by adding 0.6 part by weight of sodium dodecyl sulfate instead of Phosphanol RS-610, and a shell was prepared by adding 1.9 parts by weight of sodium rosinate instead of Phosphanol RS-610.

Here, the average particle size of the core was 316 nm, and the average particle size of the graft copolymer latex was 384 nm.

Comparative Example 2

A specimen was prepared by the same method as described in Example 1, except that a seed was prepared by adding 6.0 parts by weight of butyl acrylate instead of 4.8 parts by weight of styrene and 1.2 parts by weight of acrylonitrile, a core was prepared by adding 0.6 part by weight of sodium dodecyl sulfate instead of Phosphanol RS-610, and a shell was prepared by adding 1.9 parts by weight of sodium rosinate instead of Phosphanol RS-610.

Here, the average particle size of the core was 310 nm,

Monomers of Examples 1 to 6, and Comparative Examples 1 and 2, and adding amounts of an emulsifier are listed in Tables 1 and 2 below.

TABLE 1

| Classification | Seed (parts by weight) | | | | |
| --- | --- | --- | --- | --- | --- |
| | S | AN | BA | SDS | Phosphanol RS-610NA |
| Example 1 | 4.8 | 1.2 | — | 0.05 | — |
| Example 2 | — | — | 6.0 | 0.05 | — |

TABLE 1-continued

| | Seed (parts by weight) | | | | |
|---|---|---|---|---|---|
| Classification | S | AN | BA | SDS | Phosphanol RS-610NA |
| Example 3 | 6.0 | — | — | 0.05 | — |
| Example 4 | 4.8 | 1.2 | — | 0.05 | — |
| Example 5 | 4.8 | 1.2 | — | 0.05 | — |
| Example 6 | 4.8 | 1.2 | — | — | 0.025 |
| Comparative Example 1 | 4.8 | 1.2 | — | 0.05 | — |
| Comparative Example 2 | — | — | 6.0 | 0.05 | — |

TABLE 2

| | Core (parts by weight) | | | Shell (parts by weight) | | | |
|---|---|---|---|---|---|---|---|
| Classification | BA | Phosphanol RS-610NA | SDS | S | AN | Phosphanol RS-610NA | Sodium rosinate |
| Example 1 | 50 | 0.6 | — | 32 | 12 | 1.9 | — |
| Example 2 | 50 | 0.6 | — | 32 | 12 | 1.9 | — |
| Example 3 | 50 | 0.6 | — | 32 | 12 | 1.9 | — |
| Example 4 | 50 | 0.6 | — | 32 | 12 | — | 1.9 |
| Example 5 | 50 | — | 0.6 | 32 | 12 | 1.9 | — |
| Example 6 | 50 | 0.6 | — | 32 | 12 | 1.9 | — |
| Comparative Example 1 | 50 | — | 0.6 | 32 | 12 | — | 1.9 |
| Comparative Example 2 | 50 | — | 0.6 | 32 | 12 | — | 1.9 |

Experimental Example 1

Physical properties of the graft copolymer powders of Examples 1 to 6 and Comparative Examples 1 and 2 were measured by the following methods, and the results are shown in Table 3 below.

(1) TGA analysis: 1 g of a graft copolymer powder was increased in temperature at a rate of 20° C./min from 30 to 250° C. in a nitrogen atmosphere, and the weight loss was measured while being maintained for 1 hour at 250° C. and converted into a resin residual amount (%).

(1) Measurement of amount of gas generation: The total amount of a volatile organic compound generated for 1 hour at 250° C. from 1 g of the graft copolymer powder was measured using HS-GC/MSD.

TABLE 3

| Classification | TGA (%) | Amount of gas generation (ppm) |
|---|---|---|
| Example 1 | 99.1 | 480 |
| Example 2 | 98.9 | 478 |
| Example 3 | 98.7 | 472 |
| Example 4 | 99.2 | 573 |
| Example 5 | 99.1 | 532 |
| Example 6 | 99.5 | 463 |
| Comparative Example 1 | 98.0 | 1,010 |
| Comparative Example 2 | 97.6 | 1,021 |

Referring to Table 3, since the graft copolymer powders of Examples 1 to 6 had a higher resin residual amount in TGA analysis and a considerably lower amount of gas generation than the graft copolymer powders of Comparative Examples 1 and 2, it can be seen that the thermal stability was superior, and an amount of the volatile organic compound in the graft copolymer was reduced. In addition, as a content of the phosphate-based emulsifier adding in the preparation of the graft copolymer was increased, the resin residual amount was high and the amount of gas generation was considerably reduced.

Experimental Example 2

Physical properties of the specimens of Examples 1 to 6 and Comparative Examples 1 and 2 were measured using the following methods, and the results are shown in Table 4 below.

(3) Whiteness: The specimens were measured according to a method of CIE Lab.

(4) Retention thermal stability: The pellet-type thermoplastic resin composition was retained in a 260° C. injection molding machine for 5 minutes, and to determine a discoloration degree, L, a and b values were measured using CIE LAB color coordinates, and a discoloration degree (SE) was evaluated using the following equation.

Here, as $\Delta E$ is closer to 0, the better the thermal stability.

$$\Delta E = \sqrt{(L'-L_0)^2 + (a'-a_0)^2 + (b'-b_0)^2}$$

In this equation, L', a' and b' are L, a and b values measured using CIE LAB color coordinates after retaining the pellet-type thermoplastic resin composition in a 260° C. injection molding machine for 5 to 10 minutes, and $L_0$, $a_0$ and $b_0$ are L, a and b values measured using CIE LAB color coordinates before retention in an injection molding machine.

(5) Melt flow index (MI, g/10 min): The specimens were measured for 10 minutes according to ASTM D1238 under conditions of 220° C. and a load of 10 kg.

TABLE 4

| Classification | Whiteness | Retention thermal stability | Melt flow index |
|---|---|---|---|
| Example 1 | 63.4 | 3.3 | 10.8 |
| Example 2 | 63.1 | 3.2 | 11.2 |
| Example 3 | 62.4 | 2.9 | 10.7 |
| Example 4 | 62.5 | 3.0 | 11.4 |
| Example 5 | 63.5 | 3.2 | 11.0 |
| Example 6 | 65.2 | 2.8 | 10.8 |
| Comparative Example 1 | 60.0 | 5.5 | 11.5 |
| Comparative Example 2 | 60.3 | 5.3 | 11.0 |

Referring to Table 4, it can be confirmed that the specimens of Examples 1 to 6 exhibited superior whiteness and retention thermal stability, compared to the specimens of Comparative Example 1 and Comparative Example 2.

More specifically, it can be confirmed that the specimen of Example 6 in which a phosphate-based emulsifier was added in the preparation of a seed, a core and a shell had superior retention thermal stability, compared to the specimen of Example 1 in which a phosphate-based emulsifier was added in the preparation of a core and a shell, a specimen of Example 4 in which a phosphate-based emulsifier was added in the preparation of a core, and a specimen of Example 5 in which a phosphate-based emulsifier was added in the preparation of a shell.

In addition, it can be confirmed that the specimen of Example 1 in which a phosphate-based emulsifier was added in the preparation of a core and a shell and the specimen of Example 5 in which a phosphate-based emulsifier was added in the preparation of a shell had equivalent levels of whiteness and retention thermal stability.

The invention claimed is:

1. A method of preparing a graft copolymer, comprising:
   emulsion-polymerizing one or more selected from the group consisting of an aromatic vinyl-based monomer, a vinylcyano-based monomer and an alkyl (meth)acrylate-based monomer to prepare a seed;
   emulsion-polymerizing the seed and an alkyl (meth)acrylate-based monomer to prepare a core; and
   emulsion-polymerizing the core, an aromatic vinyl-based monomer and a vinylcyano-based monomer to prepare a shell,
   wherein one or more steps selected from the group consisting of the steps of preparing the seed, the core and the shell comprises adding an emulsifier comprising a compound represented by Formula 1 below:

<Formula 1>

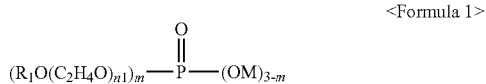

In Formula 1,
$R_1$ is a $C_1$ to $C_{20}$ alkyl group, or a $C_6$ to $C_{20}$ aryl group substituted with a $C_1$ to $C_{20}$ alkyl group,
M is hydrogen or an alkali metal,
m is 1 or 2, and
$n_1$ is any one of 1 to 18,
wherein the emulsifier further comprises a compound represented by Formula 2 below:

<Formula 2> in Formula 2, $R_2$ is a $C_1$ to $C_{20}$ alkyl group or a $C_6$ to $C_{20}$ aryl group substituted with a $C_1$ to $C_{20}$ alkyl group, $n_2$ is any one of 1 to 18, and
wherein the weight ratio between the compound of Formula 1 and the compound of Formula 2 is 80:20 to 99:1.

2. The method according to claim 1, wherein $R_1$ is a $C_{10}$ to $C_{20}$ alkyl group.

3. The method according to claim 1, wherein M is sodium or potassium.

4. The method according to claim 1, wherein $n_1$ is any one of 2 to 10.

5. The method according to claim 1, wherein the compound represented by Formula 1 is one or more selected from the group consisting of lauryl ether hexaethyleneoxide phosphoric acid, myristic ether hexaethyleneoxide phosphoric acid, palmitic ether hexaethyleneoxide phosphoric acid, stearic ether hexaethyleneoxide phosphoric acid, lauryl ether octaethyleneoxide phosphoric acid, myristic ether octaethyleneoxide phosphoric acid, palmitic ether octaethyleneoxide phosphoric acid, stearic ether octaethyleneoxide phosphoric acid, di(lauryl ether hexaethyleneoxide)phosphoric acid, di(myristic ether hexaethyleneoxide)phosphoric acid, di(palmitic ether hexaethyleneoxide)phosphoric acid, di(stearic ether hexaethyleneoxide)phosphoric acid, di(myristic ether octaethylene oxide)phosphoric acid and di(palmitic ether octaethyleneoxide)phosphoric acid and di(stearic ether octaethyleneoxide)phosphoric acid, or an alkali metal salt thereof.

6. The method according to claim 1, wherein in the preparation of a seed, the emulsifier is added at 0.01 to 0.29 part by weight with respect to 100 parts by weight of the total weight of monomers added in the preparation of the graft copolymer.

7. The method according to claim 1, wherein in the preparation of a core, the emulsifier is added at 0.1 to 1 part by weight with respect to 100 parts by weight of the total weight of the monomers added in the preparation of the graft copolymer.

8. The method according to claim 1, wherein in the preparation of a shell, the emulsifier is added at 0.1 to 3 parts by weight with respect to 100 parts by weight of the total weight of the monomers added in the preparation of the graft copolymer.

9. The method according to claim 1, wherein the average particle size of the seed is 90 to 400 nm.

10. The method according to claim 1, wherein the average particle size of the core is 180 to 600 nm.

11. The method according to claim 1, wherein the average particle size of the graft copolymer is 250 to 700 nm.

12. The method of claim 1, wherein the weight ratio between the emulsifier of Formula 1 and the emulsifier of Formula 2 is 85:15 to 98:2.

13. The method of claim 1, wherein the weight ratio between the emulsifier of Formula 1 and the emulsifier of Formula 2 is 90:10 to 97:3.

* * * * *